Patented Feb. 3, 1942

2,271,691

UNITED STATES PATENT OFFICE 2,271,691

PAPER-SIZING MEDIUM AND PROCESS FOR ITS PRODUCTION

Harald Grasshof, Berlin-Zehlendorf, and Ernst Schlumberger, Berlin-Lichterfelde, Germany No Drawing. Application February 12, 1940, Serial No. 318,628. In Germany February 20, 1939

6 Claims. (Cl. 106—238)

The invention relates to a paper-sizing medium and a process for the production thereof, and has for its object inter alia to increase the utilisation of the sizing capacity of the binding medium and to reduce the addition of the latter while obtaining the same degree of sizing, as well as to improve the properties of the paper-sizing medium with regard to stability in storage and resistance to frost.

The paper-sizing medium according to the invention consists of an aqueous dispersion of electro-osmotically treated kaolin or another treated kaolin, the greater part of its particles having a diameter much less than $1\mu$, a binding agent, in particular resin, and a protective colloid, in particular an alkali-containing protein. A preferred paper-sizing medium according to the invention consists of about 30 parts by weight of colophony, 10 parts by weight of electro-osmotically treated kaolin, 2 parts by weight of casein alkali and 60 parts by weight of water.

The content of electro-osmotically treated kaolin may be increased or decreased according to its particle size, but the upper limit should not exceed 40%. The content of protective colloid may also vary within certain limits (1-5%) according to the nature thereof and the particle size of the electro-osmotically treated kaolin employed, and a plurality of protective colloids may be employed in common. Instead of colophony, other natural or artificial resins suitable for sizing paper may be employed, preferably those leading to a high content of free resin, but also waxes, paraffin and the like, f. i. residues of distillation of liquid resins from waste lyes of the cellulose manufacture according to the soda and sulphate process. Suitable protective colloids besides the above mentioned casein alkali are alkalized animal glue (hide glue, bone glue), as well as other substances known as protective colloids, such as glues of vegetable origin. The electro-osmotically treated kaolin is distinguished by the fact that it consists for the greater part (f. i. 80-90%) of kaolin particles, the diameter of which is much less than $1\mu$.

Such a kaolin may be produced in known manner by subjecting elutriated kaolin, preferably after the addition of alkaline media, in aqueous suspension to the action of a direct current, whereby a deposit of colloidal kaolin particles is formed on one electrode, this deposit then being dried. In this way, a pulverous dry mass is obtained which forms, for example with water, an extremely fine dispersion.

In a preferred process for the production of the paper-sizing medium according to the invention, osmotically treated pulverous kaolin is intimately stirred with the molten binding agent, f. i. resin, the latter forming the continuous phase in the suspension whereupon the protective colloid, dissolved in a sufficient quantity of water, is admixed with the molten mass, preferably after the admixture of a small quantity of caustic potash, at temperatures above the softening point of the resin until a homogenous distribution is obtained, whereafter the dispersion is cooled and if necessary diluted with water. The dispersion obtained is distinguished by exceptional stability, that is to say, it has no tendency to settle even after a long period, is resistant to frost and can be employed and handled in the manufacture of paper in exactly the same way as the resin sizes hitherto usually employed. If no water is added during the cooling, the dispersion hardens into a solid means, it being necessary in this case to prevent the access of air. This solid mass may later, for example after somewhat long storage or after transport be converted with warm water into the desired liquid dispersion at the place of use.

The papers obtained are distinguished by excellent fastness to ink and resistance to tearing and have a good "touch" and a good "ring." The new paper-sizing medium is also suitable for papers smooth on one side. The sizing action, referred to the same content of resin, is considerably better than that of the best free resin sizes hitherto normally employed, so that a reduced content of resin (for example by 33%) may be employed for producing the same sizing action.

Moreover, a saving of expensive resin is effected owing to the substantial content of a cheaper size constituent in the form of the electro-osmotically treated kaolin.

Working example 150 grammes of resin are melted in an indirectly heatable melting vessel having a stirring mechanism arranged for two different speeds, by indirect heating at a low speed of rotation (for example 60 revolutions per minute). As soon as the molten mass has reached a temperature of 140–145° C., 50 grammes of electro-osmotically treated kaolin of the finest possible particle size are added with continuous slow rotation of the stirring mechanism. The mixture of resin and kaolin should then have a temperature of about 135°. After thorough mixing, the stirring mechanism is rotated at a higher speed (240–280 revolutions per minute) and 1.5% NaOH, referred to resin, is slowly added in solution to the mixture of resin and kaolin. With a 30% soda lye (300 grammes of NaOH to 1000 ccm. of H₂O) this amounts to 7.5 ccm. When the soda lye has been added, the mixture of resin and kaolin should have a temperature of about 110°. In the meantime, 4 grammes of completely alkali-soluble casein have been dissolved with the necessary quantity of NaOH (10% NaOH referred to the casein to be dissolved) after previous swelling in water and corresponding heating, by adding a total quantity of 100 ccm. of water to the casein. The finished casein soap is introduced at a temperature of about 60° C. into the mixture of resin and kaolin, which was at a temperature of about 110° C. at the beginning of the addition of the protective colloid solution as above. The temperature resulting therefrom after the complete addition of the protective colloid solution should amount to about 85° C. 100 ccm. of water of 50° C. are thereafter introduced into the dispersion while the stirring mechanism continues to rotate rapidly and 100 ccm. of cold water are then again added. If necessary, the stirring mechanism could be reduced to the low speed of rotation (60 revolutions per minute) during this dilution, in order to prevent forcing of the dispersion out of the stirring mechanism container. The dispersion, which is ready for use after the dilution has been completed, has a dry content of about 40% and may immediately be employed for sizing.

For the production of the paper-sizing medium, any of the installations hitherto employed for the production of resin size may be used, which permits melting of the resin and an intimate mixing thereof with the remaining constitutents. This mixing may take place either at fairly high temperature (with completely melted resin) or in the softening interval between the dripping point and the solidifying point. The paper-sizing medium obtained is suitable both for sizing in the pulp or on the machine and does not require any treatment differing from the usual method of use or any different type of precipitation media.

What we claim is:

1. A process for the production of a paper-sizing medium, characterized in that colloidal electro-osmotically treated pulverous kaolin the greater part of the particles of which have a diameter much less than 1 $\mu$ is intimately stirred into a molten binding agent, the latter forming the continuous phase of the suspension, whereupon to the resulting molten mass an aqueous dispersing medium together with a protective colloid is admixed until a homogeneous distribution is obtained.

2. A process according to claim 1, characterized in that the admixture of the aqueous dispersing medium together with the protective colloid is performed at a temperature above the softening point of the binding agent.

3. A process according to claim 1, characterized in that the colloidal kaolin is electro-osmotically deposited on an electrode and then dried.

4. A process according to claim 1, characterized therein that the binding agent is a fusible resin.

5. A process according to claim 1, in which the binding agent is colophony.

6. A process according to claim 1, characterized by the employment of about 30 parts by weight of fusible binding agent, 10 parts by weight of electro-osmotically purified kaolin, 2 parts by weight of protective colloid and 60 parts by weight of water.

HARALD GRASSHOF.
ERNST SCHLUMBERGER.